(No Model.)
J. B. SCRIBNER.
FOUR HORSE EVENER.
No. 367,671. Patented Aug. 2, 1887.
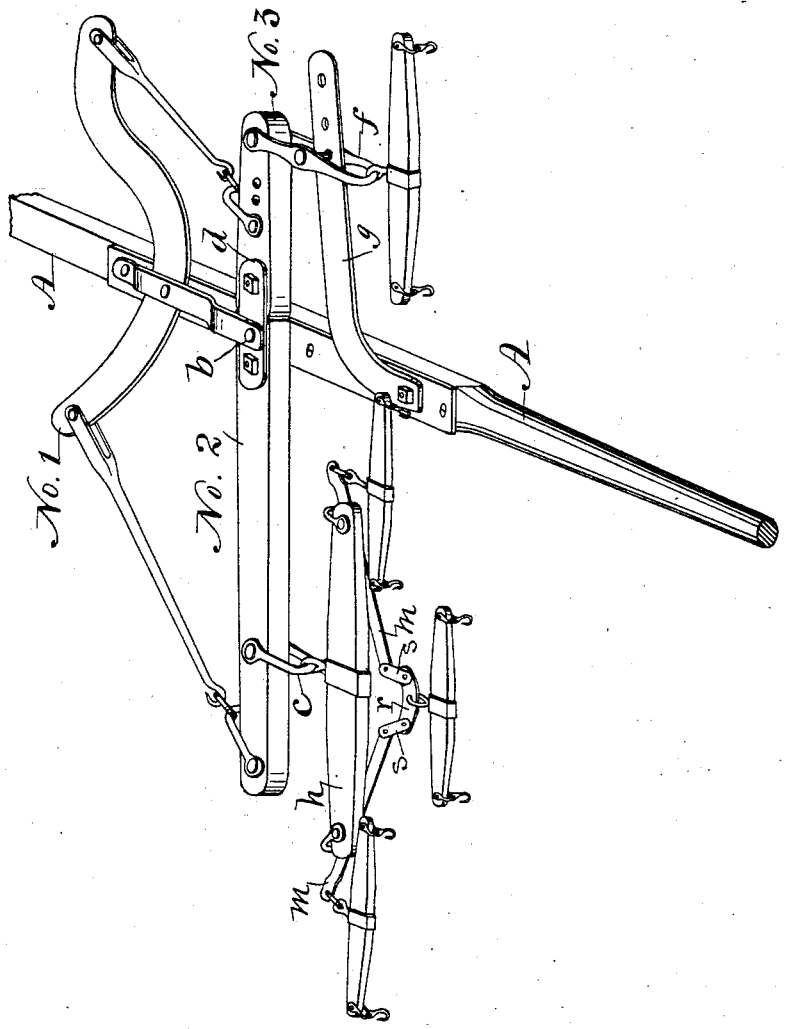
Witnesses
C. W. Stiles.
R. H. Orwig.
Inventor:
Jerry B. Scribner,
By Thomas G. Orwig, Atty.

United States Patent Office.

JERRY B. SCRIBNER, OF EMMETTSBURG, IOWA, ASSIGNOR OF ONE-HALF TO HIRAM HARRISON, OF SAME PLACE.

FOUR-HORSE EVENER.

SPECIFICATION forming part of Letters Patent No. 367,671, dated August 2, 1887.

Application filed April 25, 1887. Serial No. 236,055. (No model.)

*To all whom it may concern:*

Be it known that I, JERRY B. SCRIBNER, a citizen of the United States of America, and a resident of Emmettsburg, in the county of Palo Alto and State of Iowa, have invented a Four-Horse Evener for Reapers and Binders, &c., of which the following is a specification.

My object is to provide a means for hitching four horses abreast to a harvesting-machine, a plowing-machine, or any machine where it is necessary to place three horses on one side of the pole and only one on the other side in such a manner that the draft will be equally divided between the four horses and side draft prevented.

My invention consists in the construction and combination of three levers, a three-horse evener, and an adjustable singletree-carrier with a pole, as hereinafter set forth, pointed out in my claim, and illustrated in the accompanying drawing, in which the figure is a perspective view.

A represents the pole of a reaper or plow.

No. 1 is a lever of the first order, preferably a curved metal bar pivoted to the rear portion of the pole A.

No. 2 is a straight lever of the second order, preferably made of hard wood, pivoted to the pole A in advance of the lever No. 1 by means of a fulcrum-pin, $b$, and flexibly connected with the short arm of the lever No. 1 by means of a clevis and rod.

$c$ is a clevis attached to the outer end portion of the lever No. 2 for the purpose of connecting a three-horse evener with the said lever.

No. 3 is a short lever of the second order, hinged to the inner end of the lever No. 2 by means of metal plates $d$, and flexibly and adjustably connected with the long arm of the lever No. 1 by means of a clevis and rod.

$f$ is a singletree-carrier in the form of an elongated clevis, adjustably connected with the outer end of the lever No. 3 and a curved bar, $g$, in such a manner that a singletree carried at its front end can be readily adjusted relative to the pole A as required, to place the single horse on the one side of the pole in proper position to keep even with the three horses on the other side, to equalize the draft of all the horses, and to prevent side draft. The bar $g$ is pivoted to the pole A in advance of the levers 2 and 3 in such a manner that the complete singletree-carrier will be flexible and self-adjusting relative to the pole and the lever No. 3 whenever the singletree is moved to or from the pole and draft force applied thereto.

$h$ is a doubletree and the base of the three-horse evener.

$m$ $m$ are levers and singletree-bearers pivoted to the ends of the doubletree, and their long arms, that extend toward each other, are flexibly connected with each other and a singletree-bearer, $r$, by means of links $s$, in such a manner that three horses can be hitched thereto abreast and their individual drafts equalized with the draft of the single horse on the opposite side of the pole by means of the compound leverage produced by the connection of the levers Nos. 1, 2, and 3.

I claim as my invention—

A four-horse evener comprising the levers Nos. 1 2 3, a three-horse evener, and an adjustable singletree-carrier, $f$ $g$, arranged and combined with a pole to operate in the manner set forth, for the purposes stated.

JERRY B. SCRIBNER.

Witnesses:
T. W. HARRISON,
W. J. BROWN.